(12) United States Patent
Disantis (10) Patent No.: US 9,869,368 B2
(45) Date of Patent: Jan. 16, 2018

(54) CONNECTOR FOR SYNTHETIC AND COATED WIRE ROPE

(71) Applicant: Raymond Disantis, Willoughby Hills, OH (US)

(72) Inventor: Raymond Disantis, Willoughby Hills, OH (US)

(73) Assignee: The National Telephone Supply Company, Cleveland, OH (US)

( * ) Notice: Subject to any disclaimer, the term of this patent is extended or adjusted under 35 U.S.C. 154(b) by 208 days.

(21) Appl. No.: 14/621,683

(22) Filed: Feb. 13, 2015

(65) Prior Publication Data

US 2015/0233446 A1    Aug. 20, 2015

Related U.S. Application Data

(60) Provisional application No. 61/939,831, filed on Feb. 14, 2014.

(51) Int. Cl.
| | |
|---|---|
| *F16G 11/00* | (2006.01) |
| *F16G 11/14* | (2006.01) |
| *F16G 11/02* | (2006.01) |

(52) U.S. Cl.
CPC ............ *F16G 11/146* (2013.01); *F16G 11/02* (2013.01); *Y10T 24/3916* (2015.01); *Y10T 29/49826* (2015.01)

(58) Field of Classification Search
CPC ......... Y10T 29/53843; Y10T 29/53987; Y10T 29/49908; Y10T 29/49915; Y10T 29/49917; Y10T 29/49925; Y10T 29/49927; B23P 11/00; B25B 27/02; B21D 39/00; B21D 39/04; B21D 39/0043

USPC ................. 29/282, 505, 509, 510, 514, 515; 24/115 H, 115 K, 129 R, 256 R, 703.1; 403/278, 281

See application file for complete search history.

(56) References Cited

U.S. PATENT DOCUMENTS

| | | | | |
|---|---|---|---|---|
| 1,368,480 A | * | 2/1921 | Brown ................... | F16G 11/02 191/44.1 |
| 2,149,209 A | * | 2/1939 | Dickie .................... | H01R 4/20 174/94 R |
| 3,082,500 A | * | 3/1963 | Moreau .................. | F16G 11/02 24/115 A |
| 3,577,119 A | * | 5/1971 | Delyon .................. | H01R 4/184 439/881 |
| 3,867,046 A | * | 2/1975 | Fox ....................... | F16G 11/146 24/115 K |
| 3,927,453 A | * | 12/1975 | Zahn ...................... | H01R 4/20 174/84 C |

(Continued)

*Primary Examiner* — Sarang Afzali
*Assistant Examiner* — Darrell C Ford
(74) *Attorney, Agent, or Firm* — Fay Sharpe LLP (57) ABSTRACT

A sleeve for terminating synthetic rope and coated wire rope has a body and a first channel, a second channel, and a third channel formed within the body. Each of the first, second, and third channels form a trilobular opening within the sleeve for receiving and crimping wire rope. The wire rope can have an eye splice formed at one end. A method of crimping the trilobular sleeve includes feeding the rope through the first channel of the trilobular sleeve, looping the rope through the second channel of the sleeve and then through the third channel of the trilobular sleeve, inserting the sleeve between upper and lower crimp dies, and pressing the sleeve between the dies, thereby crimping the sleeve to the rope.

8 Claims, 6 Drawing Sheets

(56) References Cited

U.S. PATENT DOCUMENTS

| | | | | |
|---|---|---|---|---|
| 4,047,420 A * | 9/1977 | Edwards | B21F 15/06 | 29/237 |
| 4,136,987 A * | 1/1979 | Tettamanti | F16G 11/02 | 403/212 |
| 4,350,843 A * | 9/1982 | Campbell | H01R 4/186 | 174/84 C |
| 4,432,121 A * | 2/1984 | Dupre | F16B 45/00 | 24/115 H |
| 4,940,856 A * | 7/1990 | Bock | H01R 4/186 | 174/84 C |
| 4,950,838 A * | 8/1990 | Gordon | H01R 4/186 | 174/71 R |
| 5,524,327 A * | 6/1996 | Mickel | F16L 3/00 | 24/115 A |
| 5,816,094 A * | 10/1998 | Birks | F16G 11/02 | 29/517 |
| 6,035,692 A * | 3/2000 | Lucas | B21F 15/06 | 29/517 |
| 6,099,553 A * | 8/2000 | Hart | A61B 17/0487 | 24/115 A |
| 6,134,754 A * | 10/2000 | Hansson | A61M 25/02 | 24/115 R |
| 6,170,145 B1 * | 1/2001 | Lucas | B21F 15/06 | 29/282 |
| 6,260,241 B1 * | 7/2001 | Brennan | F16G 11/00 | 24/115 K |
| 6,452,103 B1 * | 9/2002 | Piriz | H01R 4/186 | 174/71 R |
| 7,063,362 B1 * | 6/2006 | Liroff | G09F 3/0352 | 24/115 H |
| 7,170,459 B1 * | 1/2007 | McKim | H01Q 9/30 | 343/709 |
| 7,462,081 B2 * | 12/2008 | Kato | H01R 4/183 | 174/84 C |
| 8,533,917 B2 * | 9/2013 | Kohler | F16G 11/046 | 24/115 R |
| 9,038,247 B2 * | 5/2015 | Dodge | F16G 11/101 | 24/115 K |
| 9,620,868 B2 * | 4/2017 | Wootton | H01R 4/22 | |
| 2004/0032372 A1 * | 2/2004 | McKim | H01Q 1/34 | 343/709 |
| 2006/0189184 A1 * | 8/2006 | Onuma | H01R 4/64 | 439/98 |
| 2009/0193926 A1 * | 8/2009 | Reynolds | F16C 1/26 | 74/502.5 |
| 2009/0229401 A1 * | 9/2009 | Reynolds | F16C 1/26 | 74/502.5 |
| 2010/0122834 A1 * | 5/2010 | Chang | B65H 75/36 | 174/135 |
| 2011/0308049 A1 * | 12/2011 | Sun | B65D 63/1027 | 24/306 |
| 2014/0212213 A1 * | 7/2014 | Meyers | F16B 7/0433 | 403/396 |
| 2016/0066654 A1 * | 3/2016 | Seader | F16G 11/10 | 24/712.9 |

\* cited by examiner

CONNECTOR FOR SYNTHETIC AND COATED WIRE ROPE

CLAIM OF PRIORITY

This application claims priority from Provisional Patent Application No. 61/939,831, filed on Feb. 14, 2014, which is incorporated by reference in its entirety herein.

BACKGROUND OF THE DISCLOSURE

There are several existing methods for splicing synthetic or coated wire rope. One method is to unweave and loosen the rope then re-weave the rope from separate bundles into a splice. This manual method is very labor-intensive, time-consuming, and expensive.

A second method for splicing wire rope is to add a chemical to the wire bundles to fuse them together along with a sleeve. The chemicals used during this process are also very expensive.

A third method which is an aspect of the present disclosure is to use a mechanical connector or compression sleeve to splice the wire rope. This method is also less expensive and less time-consuming than other methods.

Current systems for terminating synthetic rope often fall well short of matching the tensile strength of the rope using one splice. Conversely, metal wire rope terminating systems may often meet the tensile strength of the wire rope using one splice. To obtain a splice on a synthetic rope that meets the tensile strength of the synthetic rope, multiple splices must be used which results in increasing both material and labor costs. Existing systems employ splice sleeves that are simple oval shapes. Subsequent crimps on existing systems crush the ropes together into a tube.

Thus, there is a need for a crimp sleeve or connector which forms a mechanical connector for a splicing or crimping wire rope which overcomes the above-mentioned difficulties and others while providing better overall results.

There is also a need for an extruded sleeve that is trilobular; that is, a connector or sleeve which provides three channels for gripping rope. At one end of the splice can be a traditional eye splice and a thimble for attachment. At other opposite end of the connector is a simple, very tight loop. This is a result of feeding the rope through the third channel in the trilobular sleeve. The extra length of crimped rope in the third channel provides significantly greater holding force in the crimp. Basically the trilobular sleeve provides extra grip length. A thimble improves the holding capacity of the connector even further.

There is also a need for a trilobular sleeve having internal axial teeth or serrations and a rubberized plastic liner that acts as a grip between the sleeve and the wire rope.

There is also a need for crimp dies which have different profiles in each half. This allows crimping the trilobular sleeve in one direction instead of three separate directions to accommodate the trilobular profile of the sleeve.

SUMMARY OF THE DISCLOSURE

The present disclosure relates to sleeves. Specifically, it relates to a trilobular crimp sleeve which provides an extra channel for crimping rope. This channel in turn allows for greater gripping length between the rope and the sleeve.

One aspect of the disclosure is providing a connector or sleeve for mechanically crimping the wire rope.

Another aspect of the disclosure is a sleeve or connector for crimping wire rope having an eye splice with a thimble attached thereon.

Another aspect of the disclosure is that as tension exceeds the holding force of the crimp, the rope will slip in the crimp and the splice will tighten like a noose. The noose will then tighten on a thimble greatly inhibiting rope pull out from the primary crimped sleeve channel. Once the noose on the thimble is tightened, most of the tensile force in the rope is transferred to the thimble, the other two channels of the crimped sleeve and the bulge created by the "loop back" of the rope back through two channels of the sleeve. This configuration is an improvement over existing sleeve configurations that only provide the holding strength of one or two channels.

Still another aspect of the disclosure is a sleeve having internal axial teeth or serrations and a soft liner that acts as a further grip between the sleeve and the wire rope. The optional grip interface of the liner conforms readily to all the surface irregularities in both the sleeve and the wire rope jacket without compromising the jacket. Internal serrations in the sleeve would provide greater surface area than the simple oval profiles of existing sleeves. Increasing the gripping surface area is a primary factor in the holding ability of a connector and the present disclosure applies this to one splice instead of multiple splices.

In accordance with one aspect of the disclosure, a sleeve for terminating wire rope includes a body having a first channel, a second channel, and a third channel formed within the body. Each of the first, second, and third channels form a trilobular opening within the sleeve for receiving wire rope.

In accordance with another aspect of the disclosure, a method of crimping a trilobular sleeve and wire rope includes feeding a wire rope through a first channel of the trilobular sleeve, feeding the rope through a second channel of the sleeve and then looping the rope through a third channel of the trilobular sleeve; inserting the sleeve between upper and lower crimp dies; and pressing the sleeve between the upper and lower crimp dies, thereby crimping the sleeve to the rope.

Another aspect of the disclosure is a rubberized plastic liner which addresses this problem by pressing the required amount while creating a softer, less brutal squeeze.

Another aspect of the disclosure is the sleeve can be extruded, drawn, or machined.

Still another aspect of the disclosure is a sleeve which is made of metal, copper, aluminum, steel or other suitable material.

Still another aspect of the disclosure is the liner can be extruded, molded, or cast.

Yet another aspect of the disclosure is the liner can be three simple tubes, three form fitting tubes, or a single complex tube that combines three tubes.

Still another aspect of the disclosure is the crimp dies used to crimp the trilobular sleeves have two half sections, wherein each section has a different profile. This allows crimping the trilobular sleeve in one direction instead of three directions to accommodate the trilobular profile of the sleeve of the present disclosure.

Another aspect of the disclosure is a method for crimping that includes dies that have dissimilar halves.

Still other aspects of the disclosure will become apparent upon reading and understanding of the following detailed description.

DETAILED DESCRIPTION OF THE DISCLOSURE

The present disclosure relates to crimping sleeves. More particularly, it relates to a trilobular sleeve which provides three channels for crimping wire rope, such as synthetic rope or coated wire rope.

The disclosure in particular relates to a sleeve that is trilobular; that is, a sleeve that provides three channels for gripping synthetic or coated wire rope. On a first end of the wire rope can be a traditional eye splice and a thimble positioned within the eye splice. The thimble improves the holding capacity of the eye splice even further. On a second opposite end of the rope is a simple, very tight loop. This is a result of feeding the rope through two channels in the trilobular sleeve. The extra length of crimped rope in the third channel provides significantly greater holding force in the crimp. Basically the trilobular sleeve provides extra grip length.

Figure 1:
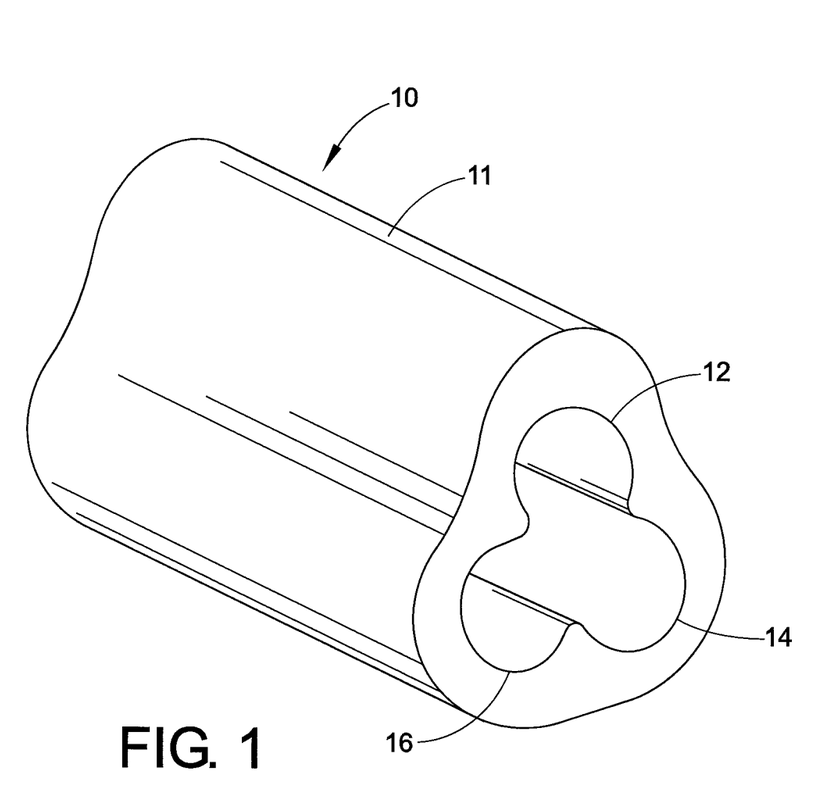
FIG. 1 is a perspective view of a basic trilobular sleeve in accordance with a preferred embodiment of the present disclosure.

Referring now to FIG. 1, a sleeve 10 is shown in accordance with a preferred embodiment of the present disclosure. Sleeve 10 can be extruded, drawn, or machined. The sleeve can be made from a range of materials, such as metal, copper, aluminum steel, titanium, etc. Specifically, the sleeve is a trilobular sleeve; that is, the sleeve has a body 11 providing three internal channels 12, 14, 16 for gripping a rope. As shown in FIG. 1, the channels 12, 14, 16 are preferably equally spaced about 120 degrees apart. However, other configurations are contemplated by the disclosure. Wire rope 30 itself can be a synthetic rope. Alternatively, the rope can be a coated galvanized wire rope or other rope.

Figure 3A:
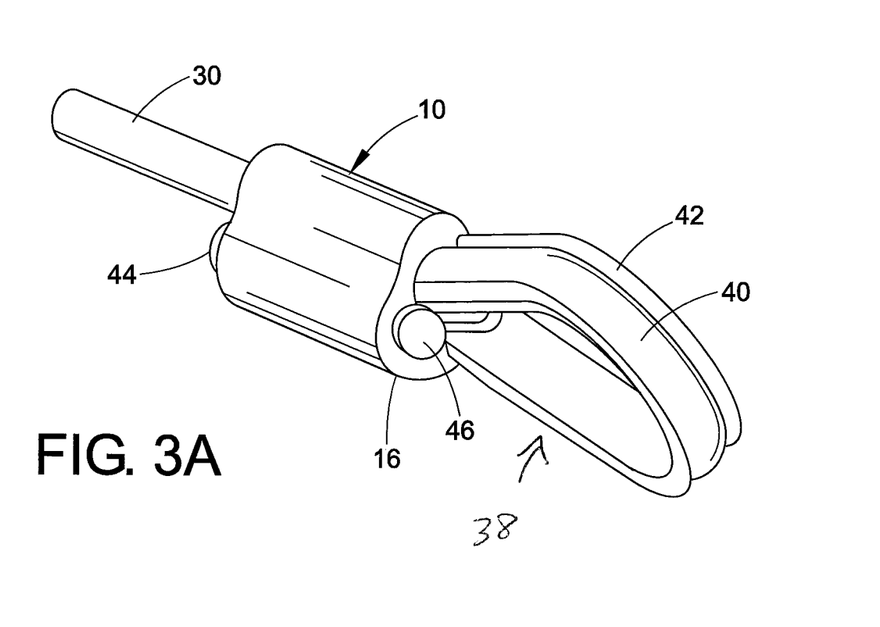
FIG. 3A is a first perspective view of an uncrimped trilobular sleeve of the present disclosure.
Figure 3B:
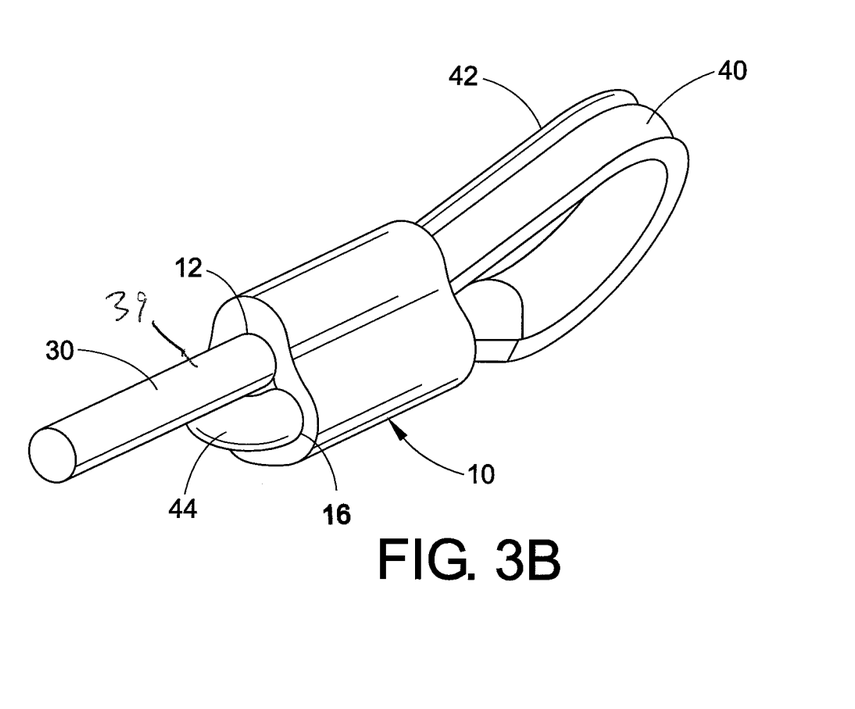
FIG. 3B is a second perspective view of an uncrimped trilobular sleeve of the present disclosure.

Referring now to FIGS. 3A and 3B, in accordance with one aspect of the disclosure, one end 38 of the wire rope has a traditional eye splice 40 and thimble 42 for attachment within the eye splice which is surrounded by the eye splice. This particular eye splice configuration is one example of a rope splice which can be used with the sleeve. Other configurations and wire splices are also contemplated by the disclosure.

A second end 39 of the wire rope is fed through sleeve first channel 12. Another end 46 of the rope is fed through second channel 14 then is looped back or bent and fed through third channel 16 and extends through and out of channel 16 as seen in FIG. 3A. That is, the other end of the wire rope is a simple very tight loop or bend 44 where the rope is looped back through the sleeve channel 16 from channel 14. This "loop back" is a result of feeding end 46 of the rope 30 through the second and third channels 14, 16 in the trilobular sleeve. The extra length of crimped rope in the third channel provides significantly greater holding force in the crimp. Basically the trilobular sleeve provides extra grip length of the rope.

Thimble 42 which is inserted within the eye splice 40 improves the holding capacity of the eye splice 40 even further. As tension exceeds the holding force of the crimp, the rope will slip in the crimp and the eye splice will tighten like a noose about the thimble. The noose tightening of the splice about the thimble then greatly inhibits the wire rope from pulling out from the crimped sleeve channels. Once the noose on the thimble 42 is tightened, most the tensile force in the rope 30 is transferred to the thimble, the other two channels 14, 16 of the crimped sleeve and the bulge created by the "loop back" 44 formed by the rope looping back through channels 14, 16. By providing three channels to hold the rope, this configuration provides significantly better holding strength than existing configurations that only provide the holding strength of one or two channels.

Figure 6:
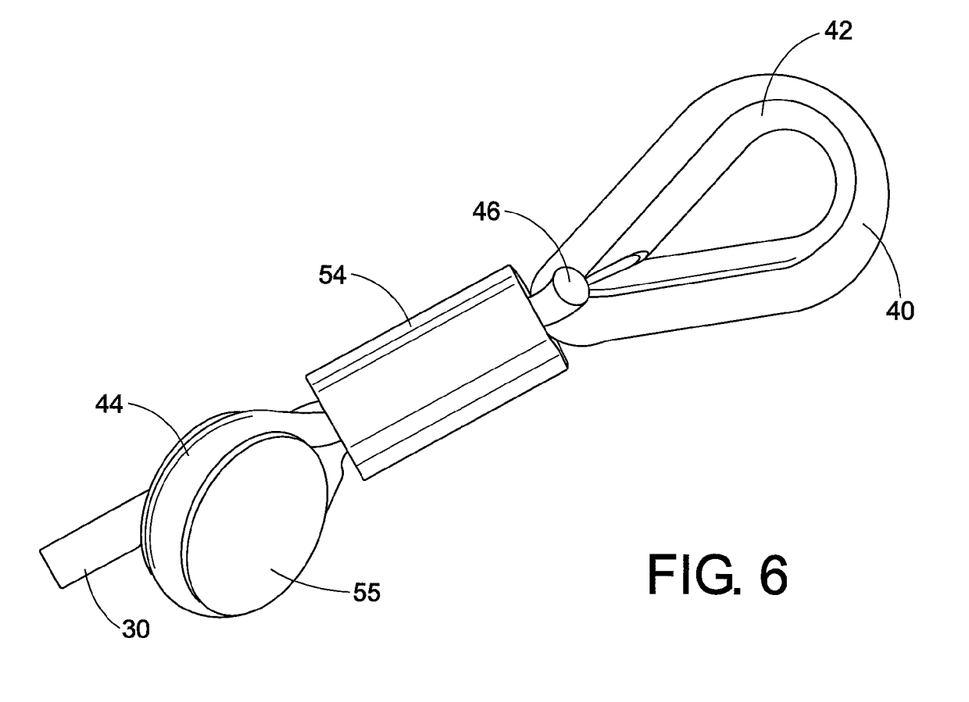
FIG. 6 is a perspective view of a crimped trilobular sleeve with a loop stop in accordance with another aspect of the disclosure.

Referring now to FIG. 6, the "loop back" 44 can be limited in size by providing an optional loop stop 55. The loop stop 55 has a round or circular shape about which the rope is wrapped around. That is, the rope is looped from channel 14 to channel 16 and also around the loop stop 55. This reduces the linear displacement of the rope assembly as tension is applied. The noose effect that applies to the thimble 42 also applies to the "rope loop back" 44.

Figure 2A:
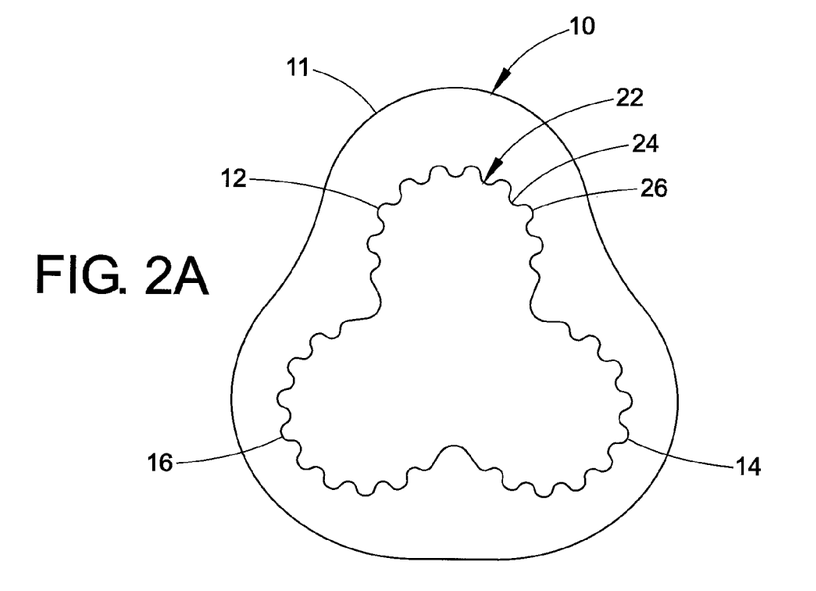
FIG. 2A is a cross-sectional side elevational view of a serrated sleeve in accordance with another aspect of the disclosure.

Referring now to FIG. 2A, teeth can be added to inner walls of the sleeve channels in accordance with another aspect of the disclosure. Specifically, internal axial teeth or serrations 22 having tips 24 and recesses 26 between the tips are shown in accordance with another aspect of the disclosure. Each of the three channels 12, 14, 16 has a plurality of axial teeth 22 and with tips 24 and recesses 26 formed therebetween where the tips 24 extend toward a center of the sleeve.

Figure 2B:
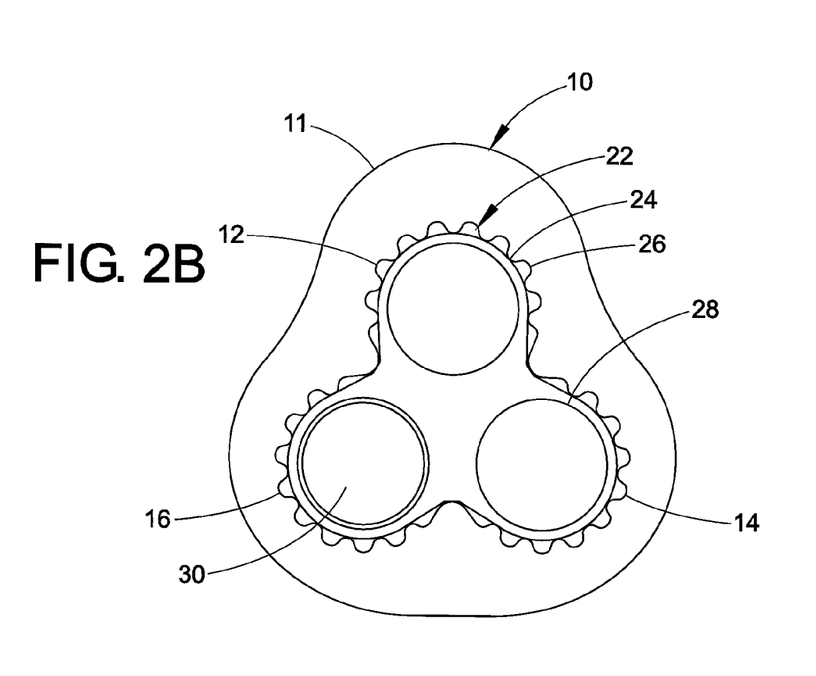
FIG. 2B is a cross-sectional side elevational view of a liner in the sleeve in accordance with another aspect of the disclosure.

Referring to FIG. 2B, a liner 26 that acts as grip between the sleeve and wire rope 30 can optionally be added to the sleeve in accordance with another aspect of the disclosure. This optional grip interface is installed directly on the teeth 22 and conforms readily to all the surface irregularities in both the sleeve and the wire rope and its coating without compromising the coating. The liner 28 can also conform to the tips 24 and recesses 26 of the internal axial teeth 22. The liner 28 can be extruded, molded, or cast. The liner 28 can be three simple tubes, three form fitting tubes, or a single complex tube that combines three tubes. Other variations of liners are contemplated by the disclosure.

Internal serrations in the sleeve 10 provide greater surface area than the simple oval profiles of existing sleeves. Increasing the gripping surface area is the primary factor in the holding power of a wire splice and the present disclosure applies this to one splice instead of multiple splices. It is important to note that the conventional logic to squeeze the wire rope more tightly together with a tighter crimp to obtain a better splice does not necessarily apply. A tighter crimp brutalizes the rope fibers consequently making them weaker. The rubberized plastic liner 28 addresses this problem by creating a softer, less brutal squeeze.

Figure 4A:
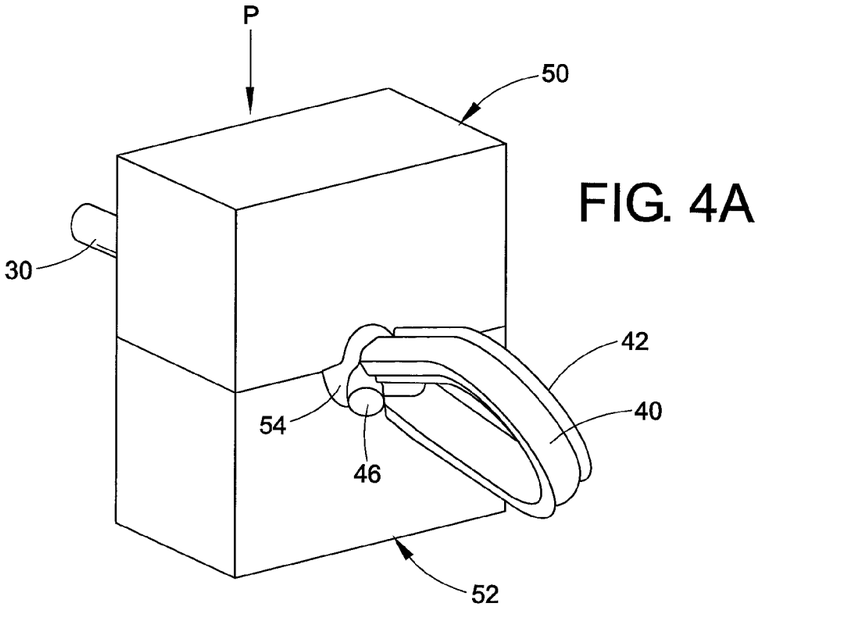
FIG. 4A is a first perspective view of a crimping die used to crimp the sleeve in accordance with an aspect of the disclosure.
Figure 4B:
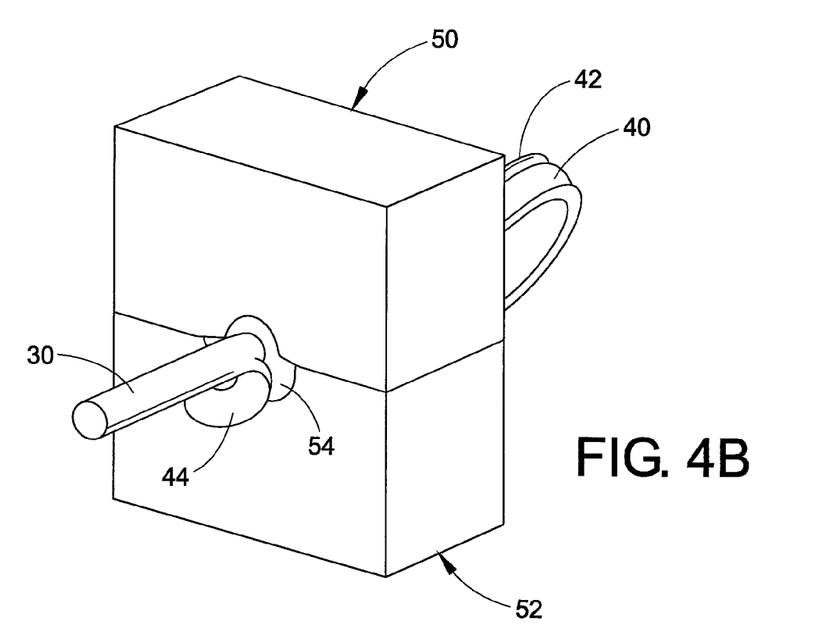
FIG. 4B is a second perspective view of the crimping die of FIG. 4A.

Referring now to FIGS. 4A and 4B, another aspect of the disclosure is a crimp press P having upper and lower mating crimp press dies 50, 52 used to crimp the sleeve 10. Each die half 50, 52 preferably has a different inner profile. This allows crimping the trilobular sleeve in one direction instead of crimping the trilobular sleeve in three different directions to accommodate the trilobular profile of the sleeve and allows the pressed sleeve 54 to be pressed in one direction.

Figure 5A:
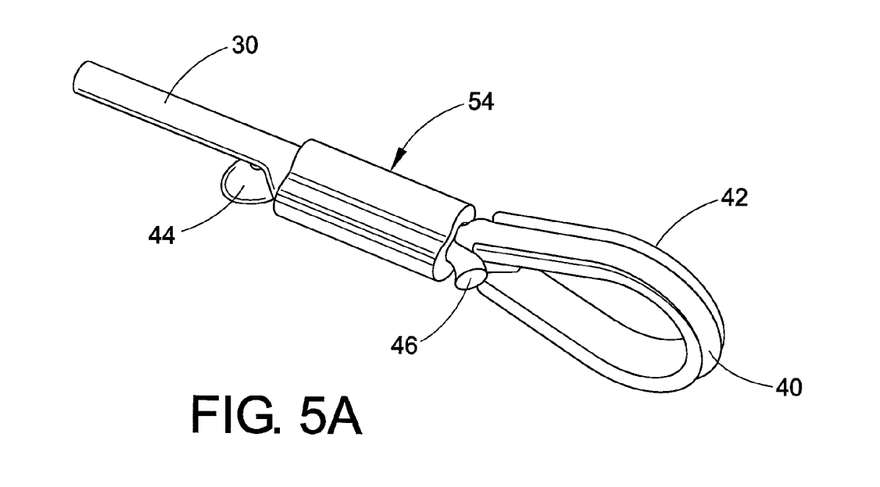
FIG. 5A is a first perspective view of a crimped trilobular sleeve of the present disclosure.
Figure 5B:
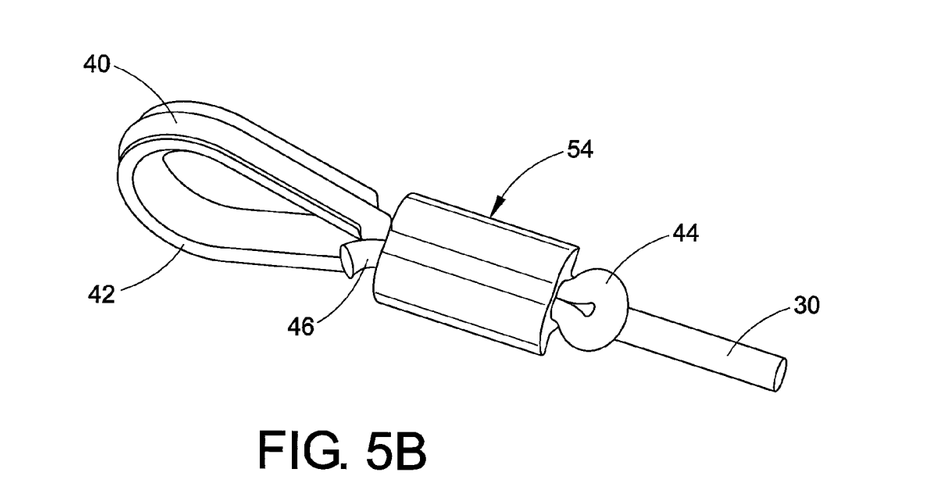
FIG. 5B is a second perspective view of the crimped trilobular sleeve of the present disclosure.

Referring now to FIGS. 5A and 5B, the sleeve 54 after being pressed and crimped by the die halves 50, 52 after removal from the crimping dies 50, 52 is shown in the two perspective views.

The exemplary embodiment has been described with reference to the preferred embodiments. Obviously, modifications and alterations will occur to others upon reading and understanding the preceding detailed description. It is intended that the appended claims be construed as including all such modifications and alterations.

The invention claimed is:

1. A method of crimping a trilobular sleeve, comprising:
   providing a trilobular sleeve comprising a passage formed of a first channel, a second channel and a third channel which are connected to each other, each of the first channel, the second channel, and the third channel being spaced about 120 degrees apart;
   feeding a wire rope through said first channel of said trilobular sleeve in a first direction, looping said wire rope through said second channel of said trilobular sleeve in a second direction, and then looping through said third channel of said trilobular sleeve;
   inserting said trilobular sleeve between upper and lower crimp dies;
   pressing said trilobular sleeve between said upper and lower crimp dies, thereby crimping said trilobular sleeve to said wire rope.

2. The method of claim 1, wherein said upper crimp die and said lower crimp die have different profiles.

3. The method of claim 1, wherein each of said first channel, said second channel, and said third channel comprises a plurality of teeth and recesses formed between said teeth.

4. The method of claim 3, wherein said plurality of teeth of each of said first channel, said second channel, and said third channel extend inwardly toward a center of said trilobular sleeve.

5. The method of claim 1, further comprising a liner which is installed directly on said plurality of teeth on said first channel, said second channel, and said third channel.

6. The method of claim 1, wherein said wire rope further comprises an eye splice and thimble positioned within said eye splice, wherein a first end of said wire rope is fed through said first channel of said trilobular sleeve.

7. The method of claim 6, wherein a second end of said wire rope is looped through said second channel and said third channel of said trilobular sleeve forming a loop back of said wire rope.

8. The method of claim 7, wherein said loop back of said wire rope is wrapped around a loop stop to reduce displacement of said wire rope.

\* \* \* \* \*